United States Patent [19]

Goullet et al.

[11] 4,338,136

[45] Jul. 6, 1982

[54] METHOD OF MAKING FAST-BREAKING BITUMINOUS EMULSIONS

[75] Inventors: Pierre Goullet; Pierre Scotte, both of Toulouse, France

[73] Assignee: APC-Azote et Produits Chimiques, S.A., Toulouse, France

[21] Appl. No.: 20,893

[22] Filed: Mar. 15, 1979

Related U.S. Application Data

[63] Continuation-in-part of Ser. No. 832,852, Sep. 13, 1977, abandoned.

[30] Foreign Application Priority Data

Sep. 16, 1976 [FR] France .................................. 76 27780

[51] Int. Cl.$^3$ ............................................... C09D 3/24
[52] U.S. Cl. ............................... 106/273 N; 106/277; 106/278; 106/281 N; 252/311.5
[58] Field of Search ................... 106/273 N, 278, 277, 106/281 N; 252/311.5

[56] References Cited

U.S. PATENT DOCUMENTS

| | | | |
|---|---|---|---|
| 2,766,132 | 10/1956 | Blair, Jr. | 106/273 N |
| 3,230,104 | 1/1966 | Falkenberg et al. | 106/277 |
| 3,423,221 | 1/1969 | Borgfeldt | 106/277 |
| 4,073,659 | 2/1978 | Burris | 106/278 |
| 4,094,696 | 6/1978 | Burris | 106/278 |

FOREIGN PATENT DOCUMENTS 1537686  1/1967  France .

*Primary Examiner*—John Kight, III
*Assistant Examiner*—Amelia B. Yarbrough
*Attorney, Agent, or Firm*—Millen & White

[57] ABSTRACT

Fast-breaking bituminous emulsions are prepared by using a liquid emulsifying agent obtained by condensation at a temperature of 160°–180° C. of diethylenetriamine and a $C_{12-18}$ fatty acid having an iodine value of at least 25, followed by at least partial cyclization of the condensation product at a temperature between approximately 190° and 240° C., the initial molar ratio between the diethylenetriamine and the fatty acid being at least 5 to 1, and the end product having a total amine index of at least 5.6 and optionally containing up to 10% free diethylenetriamine.

18 Claims, No Drawings

METHOD OF MAKING FAST-BREAKING BITUMINOUS EMULSIONS

BACKGROUND OF THE INVENTION

This application is a continuation-in-part of Ser. No. 832,852, Sept. 13, 1977, abandoned.

This invention relates to a method of making bituminous emulsions, more particularly to a method of making fast-breaking bituminous emulsions.

Surface coatings for roads, parking areas, recreational areas, yards, industrial grounds and the like are conventionally made of mixtures of mineral aggregates and bitumen, tar or any other suitable hydrocarbon binding agent. When forming basic strata or continuous layers of a large surface area, the mineral aggregates and the binding agent can be deposited simultaneously. According to a preferred technique, both are mixed in advance in a mechanical mixer at a convenient time prior to application on the road or other large surface. The hydrocarbon binding agent must therefore be fluid enough to be easily poured on or spread over the aggregates. This fluidification is performed conventionally for example by the hot coating technique, the cut-back technique or the emulsion technique. In the latter case, the emulsions are necessarily of the slow-breaking type in order to prevent premature breaking in the mixer.

However, for the maintenance of small area surfaces or for the formation of superficial or temporary layers, the preferred technique comprises spreading a hydrocarbon binding agent, gravelling and lastly rolling. For the various binding agents which can be used, fast-breaking bituminous emulsions constitute the best choice for fluidification. They can be used equally well in dry or cold and damp weather; ensure a very good adhesion of the mineral aggregates; and allow a very rapid reuse of the surface, e.g., to vehicular traffic.

Conventional emulsifying agents for preparation of fast-breaking emulsions are generally fatty amines. However, disadvantageously, these are pasty products, being rather firm at normal room temperature. It is thus necessary to heat them in order to prepare the emulsions. Industrially, the water and the hydrocarbon binding agent used for the preparation of the emulsion must also be heated, resulting in both a loss of time and a consumption of energy. Various diamine emulsifiers, and more specially those derived from tallow fatty acids, are to be found on the market for this kind of application.

Products obtained by heating stoichiometric amounts of fatty acids and polyamines have also been suggested as emulsifying agents, such as described in French Pat. No. 1,537,686 and in U.S. Pat. No. 2,766,132. However, it appears that either emulsions cannot be prepared at all with such reagents, or if prepared, they cannot be stored since they break instantaneously. Therefore, according to said patents, additional components are required for such products, increasing their complexity and cost.

SUMMARY OF THE INVENTION

It is one object of this invention to alleviate the foregoing disadvantages by facilitating the production of fast-breaking emulsions using an emulsifying agent which advantageously is liquid at room temperature.

Accordingly, the present invention provides a method of preparing fast-breaking bituminous emuslions which comprises employing a liquid emulsifying agent obtained by condensation at a temperature of 160°–180° C. of diethylenetriamine and a $C_{12-18}$ fatty acid having an iodine value of at least 25, followed by at least partial cyclization of the condensation product at a temperature between approximately 190° and 240° C.; the initial molar ratio between the diethylenetriamine and the fatty acid being at least 5 to 1, and the end product having a total amine index of at least 5.6 and optionally containing up to 10% free diethylenetriamine. It also provides emulsions prepared by this method.

DETAILED DISCUSSION

In order to obtain a liquid agent having good characteristics as an emulsifying agent for the preparation of fast-breaking emulsions, the end product of the reaction must have a total amine index at least 5.6, suitably between 5.6 and 6.2, and preferably between 5.8 and 6.0. The method used to measure the total amine index is ASTM D 2073-66, Procedure 6; Procedure for Total Amine Value, modified in that 0.1 N HCl in isopropanol is used instead of 0.5 N HCl and a 0.25 g sample is taken instead of 0.5 g. The total amine index is expressed as the number of milliliters of 1 N HCl necessary to neutralize 1 g of the product. The total amine index = (ASTM total amine value)/56.1.

According to the present invention, a product having a sufficiently high amine index is obtained when the initial molar ratio between the diethylenetriamine and the fatty acid is at least 5, suitably between 5 and 7, and preferably between 5.5 and 7. When the initial molar ratio is less than 5, the total amine index of the reaction product is less than 5.6. At such low ratios the reaction between the polyamine and the fatty acid probably leads to the formation of a high proportion (i.e., more than 30%) of products having more than one fatty chain, i.e. diamides and amidoimidazolines, which have a low total amine index, of about 1.6. This is the case for the 1:1 product of tall oil and diethylenetriamine of U.S. Pat. No. 2,766,132, which product also is not liquid at room temperature. Such a product cannot be used alone as an emulsifying agent since emulsions formed with it break instantaneously. On the other hand, it has been found that use of an initial molar ratio between the diethylenetriamine and the fatty acid above 7 is not advantageous, since the total amine index of the reaction mixture is not significantly modified thereby.

The reaction product from the cyclization step is composed of a mixture of components having a single fatty chain, cyclized or uncyclized, and of components having more than one fatty chain, also cyclized or uncyclized. The components with a single fatty chain are aminoamides or imidazolines and the components with more than one fatty chain are diamides or amidoimidazolines.

For a better understanding, the reactions are described in detail. Using an initial ratio of diethylenetriamine to fatty acid of at least 5:1, the condensation step produces predominantly aminoamides I and II having a single fatty chain, which subsequently cyclize to the same imidazoline III.

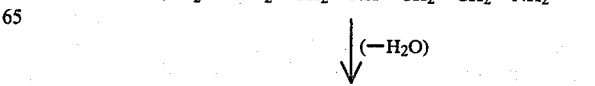

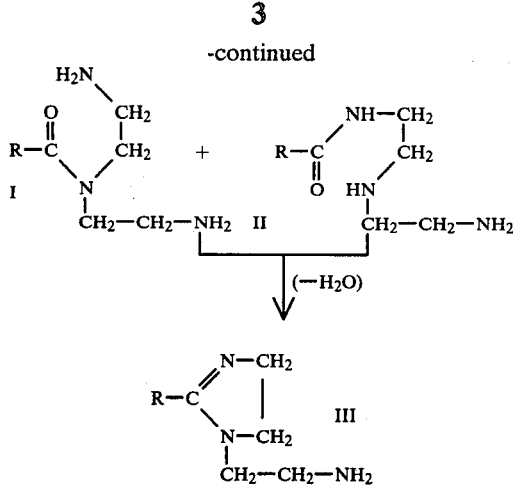

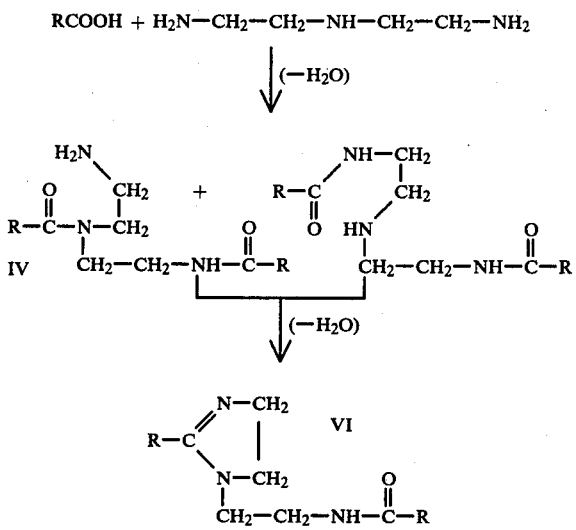

When a low ratio of diethylenetiamine to fatty acid is used, e.g., 1:1, substantial amounts of diamides IV or V are formed, which cyclize to amidoimidazoline VI.

The starting material amine and fatty acids having 12–18 carbon atoms may be pure or of industrial quality. The acids may be used individually or in mixtures, including particularly acids of animal or vegetable origin, or synthetic acids. Best results are obtained when using fatty acids or mixtures of fatty acids which are little saturated, i.e., which have iodine values higher than 25, preferably from 40 to 105. The Wijs method is used for measuring the iodine values. Suitable acids include dodecenoic, myristoleic, palmitoleic and/or oleic acids. The industrial product composed primarily of a mixture of oleic and stearic acid, derived from tallow for example, having an iodine value of about 40, can be used with success. Preferably, a distilled oleic acid having an iodine value higher than 40, preferably 90 to 95 is used.

The condensation step is carried out at 160°–180° C., preferably 160° to 175° C. at atmospheric presure. Such conditions are conventional and are described for example in U.S. Pat. No. 2,528,378 to Mannheimer.

The cyclization step is carried out at a temperature between about 190° and 240° C., preferably 200° to 220° C.

In practice, the condensation step and the cyclization step are generally carried out for at least 5 hours each, in the given temperature ranges. With shorter runs, the reaction is not complete and produces compounds which do not have the required total amine value. Suitable run times are 5 to 10 hr, preferably 5 to 6 hr for the condensation, and 5 to 10 hr, preferably 5 to 6 hr, for the cyclization.

During the second step the excess unreacted amine is removed from the reaction by distillation at the temperatures employed in the cyclization reaction. Consequently, the total amine index of the reaction mixture drops continuously during the reaction due to both cyclization and distillation. The final product mixture is obtained by termination of the second step when the total amine index becomes less than 6. Termination is effected by lowering the temperature to below 190° C.

When the total amine index is too low, for example lower than 5.6, an amount of diethylenetriamine sufficient to attain a total amine index of at least 5.6, may be added. Thus, in addition to the components having fatty acid chains mentioned above, the product can contain up to 10%, preferably up to 7% of free amine. The free amine is generally diethylenetriamine. But it is also possible, if desired, to use triethylenetetramine or a mixture of these two amines to set the total amine index to the optimal value.

The increase in temperature from the condensation step is all that is required to effect the cyclization reaction. The cyclization is conventional and is described for example in U.S. Pat. No. 2,528,378 to Mannheimer.

Alternatively, the reaction mixture containing the final product can be distilled in order to separate the component having the desired total amine index, i.e., the almost pure imidazoline derived from the diethylenetriamine and the fatty acid. However, it has been found that such an operation is not required and that the unpurified product as described above can be used as an excellent emulsifier.

The preparation of bituminous emulsions using the emulsifiers of this invention is completely conventional, starting from customary hydrocarbon binding agents. No special precautions need be taken and a mere contact and thorough mixing of the hydrocarbon binding agent, the emulsifying agent and water acidified at the convenient acid pH value is required. Bitumens of normal penetration index, such as 180/220, or harder may be used. (Penetration index measures the resistance of a material to the penetration of a standardized cone. For the determination of this index, a cone having a length of 50 mm and a vertex angle of 8.7–9.7 degrees is used. The cone is surmounted by a small weight and a shaft which can slide freely in a guide tube provided with a stop-device. The movable part including the cone weighs 100±0.05 g. The tip of the cone is brought into contact with the bitumen, the movable part is liberated for 5 seconds and then blocked in its position. The penetration of the cone in the bitumen is measured and the index expressed in 1/10 mm.) The bitumen concentration of emulsions of this type is generally about 60%, though higher concentrations, for example 65% bitumen, can also be obtained. No special procedures are required to form the emulsion. Simply bringing water, hydrocarbon binding agent and the emulsifying agent into contact, with agitation, will suffice.

The aqueous phase, as in all cases where cationic emulsifying agents are used, has an acidic pH value. The optimal values are generally in the range of 3–3.5 and can be easily determined by a worker skilled in the art in consideration of the characteristics of the bitumen.

pH values lower than 3 can be used. They permit a decrease in the amount of emulsifying agent required, but they also decrease the adhesivity of the treated bitumen. Conversely, the use of pH values higher than 4 necessitates the use of significantly greater amounts of emulsifying agent. These acidic pH vlaues are obtained by fully conventional techniques by the addition of an acid, e.g., acetic or hydrochloric acid. The latter is preferably used, for reasons of price.

The quantities of emulsifying agent to be used are low. It has been found that between 1.5 and 5 kg/metric ton of emulsion, optimally between 2-3 kg/metric ton, can be used.

The emulsion typically comprises from 50 to 30% of water and 50 to 70% of hydrocarbon binding agent.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples all temperatures are set forth uncorrected in degrees Celsius; unless otherwise indicated, all part and percentages are by weight.

EXAMPLES

Example 1

This example illustrates the preparation of a liquid product to be used as an emulsifying agent of this invention. In one hour, 6.1 tons of diethylenetriamine were introduced into a cold reaction vessel. Thereafter, under agitation, 2.5 tons of oleic acid were introduced. This mixture was heated for 6 hours at 170° C. The temperature was then raised over one hour to 210° C. and maintained at this value for 6 hours. The temperature was then lowered to room temperature. 2.7 tons of finished product having a total amine index of 5.82 were recovered. The excess diethylenetriamine removed during the second step (5.25 tons) was recovered and used for another preparation.

Example 2

This example shows the variation in the breaking speed of an emulsion, according to the nature of the mineral aggregate. The method used involves measurement of the bitumen weight deposited on the aggregate under the following conditons.

For this laboratory test, 10 g of mineral aggregate of particle sizes between 0.8 and 2 mm were weighed, washed and dried. They were placed in a beaker containing a glass rod. The whole was weighed (A) and placed for one hour in a cabinet saturated with water vapor, the beaker being covered with a moistened filter paper. There was poured into the beaker 10 g of an emulsion containing C g of bitumen and the whole was mixed with the rod. The whole was again left in the damp cabinet for one hour. The mineral aggregate was then washed with distilled water to separate the excess emulsion, the rinsing water passing over a 0.18 mm sieve to obviate any aggregate loss. The washing was repeated until the water was clear. The beaker and the rod were heated at 100° C. in a closed cabinet till the weight was constant and then cooled and weighed (B).

The breaking index according to this method is $[(B-A)100]/C$.

The emulsion which was used, having 60% of normal road bitumen 180/220, had a pH of 3. The emulsifying agent, comprising the reaction product of an oleic acid with an iodine value of 90 and diethylenetriamine, contained 5% free diethylenetriamine and had a total amine index of 5.94.

With an alkaline aggregate such as marble, the breaking index was 1.5, and with an aggregate of mixed character, such as porphyry, the breaking index was 0.9.

Lower breaking indices, for example 0.4 over porphyry and 0.8 over marble, were measured for the conventional aminated emulsifying agent, such as the commercial compound composed primarily of a diamine derived from tallow fatty acid.

In addition, the preparation of bituminous emulsions with the latter type of reagents requires large energy consumption: the water has to be heated to about 60° C., the emulsifying agent to about 80° C. and the bitumen to about 120° C.

With another conventional agent, composed of nitrogen heterocyclic compounds and having a total amine index of 4.98, the heterocyclic compounds being presumably of the imidazoline type, using in the emulsion a bitumen of the same penetration index (180/220) but of a different origin, the breaking indices were equal to 1.8 over prophyry and 1.4 over marble, compared to 0.6 over porphyry and 0.2 over marble for the emulsifying agent of this invention. The breaking indices for the emulsions prepared with such conventional agents having a low total amine index are higher than those of this invention, but the stability of these emulsions is particularly bad, which makes their use very difficult.

Example 3

The breaking index over cement, which provides an evaluation of the capacity of the emulsion to coat fine aggregates, was measured using an emulsion prepared as in Example 2.

For this measurement, 10-15 g/min of Portland cement were poured into a sample of 100 g of emulsion, the introduction of the cement being performed regularly. The emulsion was maintained in an agitated condition with a small agitator. The breaking index over cement is that quantity of cement poured until breaking or agglomeration of the bitumen occurs.

When using an emulsifying agent of this invention obtained from oleic acid having an iodine value of 95 and diethylenetriamine, containing no free amine and having a total amine index of 5.72, the breaking index over cement was about 26%. By way of comparison, this index for a known aminated reagent was 32%, this commercial product being composed primarily of a diamine derived from tallow fatty acid.

For the latter, the breaking of the emulsion was less rapid than was the emulsifying agent of this invention.

Example 4

This example shows the storage characteristics of an emulsion containing 2 kg/metric ton of an emulsifying agent of this invention, such as defined in example 2.

For this laboratory test, a test tube having a volume of 500 cc, a height of 35 cm and a diameter of 5 cm was filled with the emulsion. The test tube was left standing for 7 days in the dark at room temperature. After this time, the total sedimentation was measured, i.e. the difference in the amount of water in the higher and the lower 50 cc volume was measured. The composition of the emulsion in the lower part of the test tube was also determined.

With the emulsion of this invention, the sedimentation after 7 days was 24%. In the lower 50 cc of the test tube, the bitumen concentration was 68.3%, which in practice means the storage containers are easy to drain. It was also noted that this value varied little with the pH of the emulsion. For example, it changed from 66.8 to 70.2% when the pH varied from 2.5 to 3.5. To the contrary, with the conventional aminated reagents, the bitumen concentration varies from 64.5 to 74% in the same pH range. The latter value does not permit easy draining.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a fast-breaking bituminous emulsion which comprises water, a bituminous hydrocarbon binding agent and an emulsifying agent, the improvement wherein said emulsifying agent is a liquid emulsifying agent prepared by a process which comprises condensing diethylenetriamine and a $C_{12-18}$ fatty acid having an iodine value of at least 25, at a temperature between 160° and 180° C., followed by at least partially cyclizing the condensation product at a temperature between about 190° and 240° C.; the initial molar ratio between the diethylenetriamine and the fatty acid being at least 5:1 and the final product having a total amine index of at least 5.6.

2. The emulsion of claim 1 wherein the initial molar ratio between the diethylenetriamine and the fatty acid is 5.5–7:1.

3. The emulsion of claim 1 wherein up to 10% of free diethylenetriamine, triethylenetetramine or a mixture thereof is added to the product of the cyclization reaction.

4. The emulsion of claim 1 wherein the condensation reaction is run for at least 5 hours and the cyclization reaction is run for at least 5 hours.

5. The emulsion of claim 1 wherein the cyclization is stopped when the total amine index of the reaction product becomes lower than 6.0.

6. The emulsion of claim 3 wherein the final total amine index of the reaction mixture is adjusted by addition of diethylenetriamine.

7. The emulsion of claim 1 wherein the fatty acid has 18 carbon atoms.

8. The emulsion of claim 7 wherein the fatty acid has an iodine value higher than 40.

9. The emulsion of claim 1 wherein the hydrocarbon binding agent is bitumen.

10. The emulsion of claim 1 wherein the final product has a total amine index of 5.8–6.2.

11. The emulsion of claim 1 wherein the final product has a total amine index of 5.8–6.0.

12. The emulsion of claim 1, comprising about 1.5–5 kg/metric ton of emulsifying agent, 50–30% of water and 50–70% of bituminous hydrocarbon binding agent.

13. A composition which comprises the set emulsion of claim 1.

14. The composition of claim 13 which further comprises a mineral aggregate.

15. A method of preparing a fast-breaking bituminous emulsion at ambient temperature which consists essentially of agitating at ambient temperature water having an acidic pH, bituminous hydrocarbon binding agent, and an emulsifying agent which is liquid at room temperature, wherein said liquid emulsifying agent is prepared by a process which comprises condensing diethylenetriamine and a $C_{12-18}$ fatty acid having an iodine value of at least 25, at a temperature between 160° and 180° C., followed by at least partially cyclizing the condensation product at a temperature between about 190° and 240° C.; the initial molar ratio between the diethylenetriamine and the fatty acid being at least 5:1 and the final product having a total amine index of at least 5.6.

16. The method of claim 15, wherein said emulsion contains about 1.5–5 kg/metric ton of emulsifying agent, 50–30% of water and 50–70% of bituminous hydrocarbon binding agent.

17. In a method of providing a ground surface containing bituminous hydrocarbon binding agent and mineral aggregate, which method comprises the steps of spreading onto the ground to be surfaced a fast-breaking bituminous emulsion comprising said bituminous hydrocarbon binding agent, water and an emulsifying agent; gravelling; and rolling, the improvement which comprises employing as said emulsion the emulsion of claim 1.

18. In a method of providing a ground surface containing bituminous hydrocarbon binding agent and mineral aggregate, which method comprises the steps of spreading onto the ground to be surfaced a fast-breaking bituminous emulsion comprising said bituminous hydrocarbon binding agent, water and an emulsifying agent; gravelling; and rolling, the improvement which comprises employing as said emulsion an emulsion prepared by the method of claim 15.

* * * * *